(12) United States Patent
Berthomieu et al.

(10) Patent No.: US 9,827,964 B2
(45) Date of Patent: Nov. 28, 2017

(54) PNEUMATIC BRAKE BOOSTER

(71) Applicant: Robert Bosch GmbH, Stuttgart (DE)

(72) Inventors: Bruno Berthomieu, Gavà (ES); Esteve Cortes, Barcelona (ES); Jaume Casasnovas, Barcelona (ES)

(73) Assignee: ROBERT BOSCH GMBH, Stuttgart (DE)

( * ) Notice: Subject to any disclaimer, the term of this patent is extended or adjusted under 35 U.S.C. 154(b) by 318 days.

(21) Appl. No.: 14/546,200

(22) Filed: Nov. 18, 2014

(65) Prior Publication Data
US 2015/0204361 A1 Jul. 23, 2015

(30) Foreign Application Priority Data
Nov. 22, 2013 (FR) ...................... 13 61510

(51) Int. Cl.
*B60T 13/52* (2006.01)
*B60T 13/567* (2006.01)
*B60T 13/569* (2006.01)
*F16F 1/13* (2006.01)
*B60T 13/44* (2006.01)

(52) U.S. Cl.
CPC ............. *B60T 13/52* (2013.01); *B60T 13/44* (2013.01); *B60T 13/567* (2013.01); *B60T 13/569* (2013.01); *F16F 1/13* (2013.01)

(58) Field of Classification Search
CPC ...... B60T 13/52; B60T 13/567; B60T 13/569; F16F 1/13; F16F 1/12; F16F 13/12; B60G 11/54
USPC .......................... 91/376 R; 267/287, 33, 169
See application file for complete search history.

(56) References Cited

U.S. PATENT DOCUMENTS

| | | | | |
|---|---|---|---|---|
| 3,806,150 A * | 4/1974 | Peart | .......................... | F16F 1/13 267/287 |
| 6,186,488 B1 * | 2/2001 | Lauer | ................... | B60G 17/005 267/169 |
| 8,375,843 B2 * | 2/2013 | Calvo | ................... | B60T 13/567 188/356 |
| 8,398,060 B2 * | 3/2013 | Stanforth | .................. | F16F 1/13 188/378 |

(Continued)

FOREIGN PATENT DOCUMENTS

| | | | | |
|---|---|---|---|---|
| DE | 2817219 A1 * | 5/2002 | ............. | B60T 13/52 |
| FR | 2643429 * | 8/1990 | ................ | F16F 1/13 |
| IT | EP 0552811 A1 * | 7/1993 | ............. | B60G 11/52 |

OTHER PUBLICATIONS

FR 2817219A machine translation to English from espacenet. 2002.*
FR2643429 English machine translation from espacenet. 1990.*

*Primary Examiner* — Edelmira Bosques
*Assistant Examiner* — Michael Quandt
(74) *Attorney, Agent, or Firm* — Norton Rose Fulbright US LLP; Gerard Messina

(57) ABSTRACT

A pneumatic brake booster includes a drive piston actuating a master cylinder by a push rod while being returned to rest position by a return spring. The brake booster has a vibration damper having a part made of an elastic material working compressively, of overall parallelepipedic shape, with a length greater than the spacing of two coils of the spring prior to its installation in the brake booster and whose front and back faces are equipped with a longitudinal slit penetrating the material mass of the damper for engagement by way of those slits on the two coils of the return spring.

11 Claims, 4 Drawing Sheets

(56) References Cited

U.S. PATENT DOCUMENTS

2010/0109428 A1\* 5/2010 Yamashita .............. B60T 13/57
  303/31

\* cited by examiner

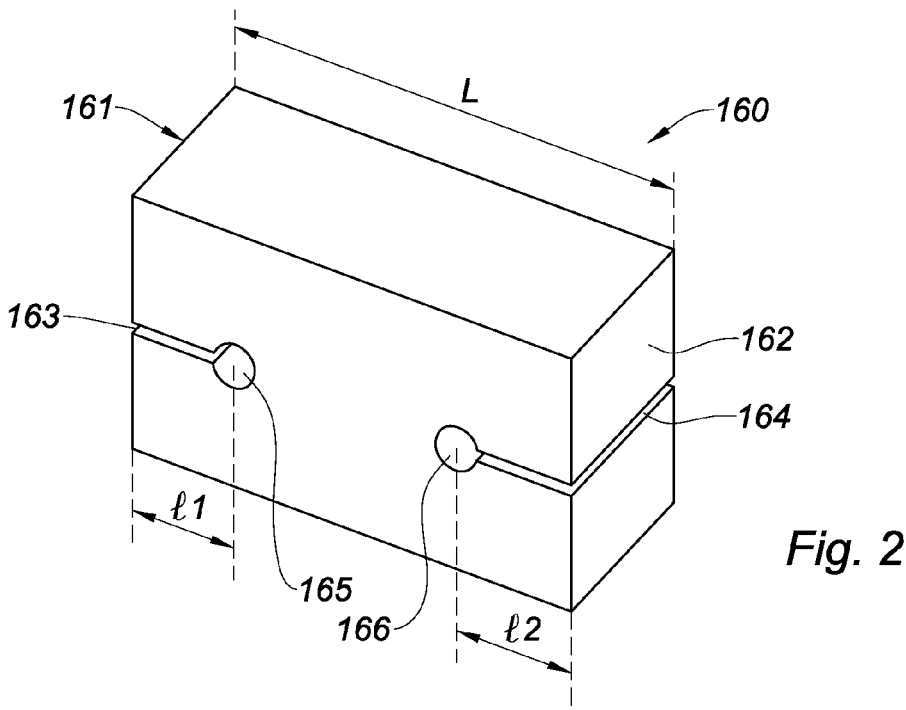
*Fig. 2*
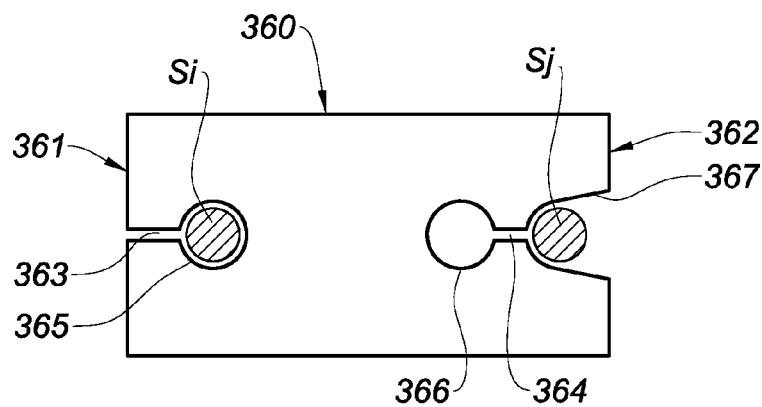
*Fig. 6A*
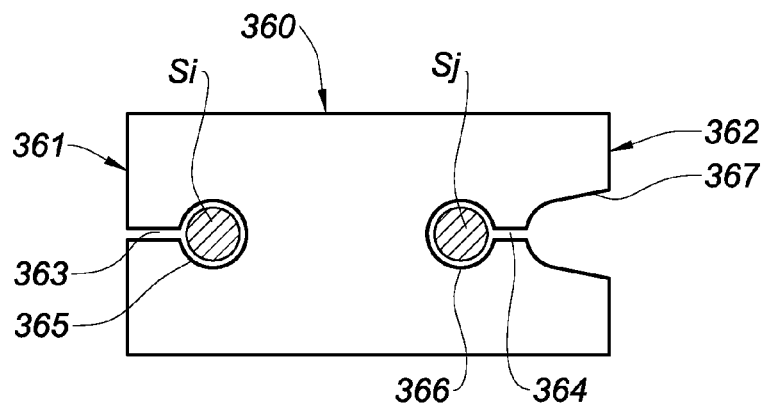
*Fig. 6B*
*Fig. 6*

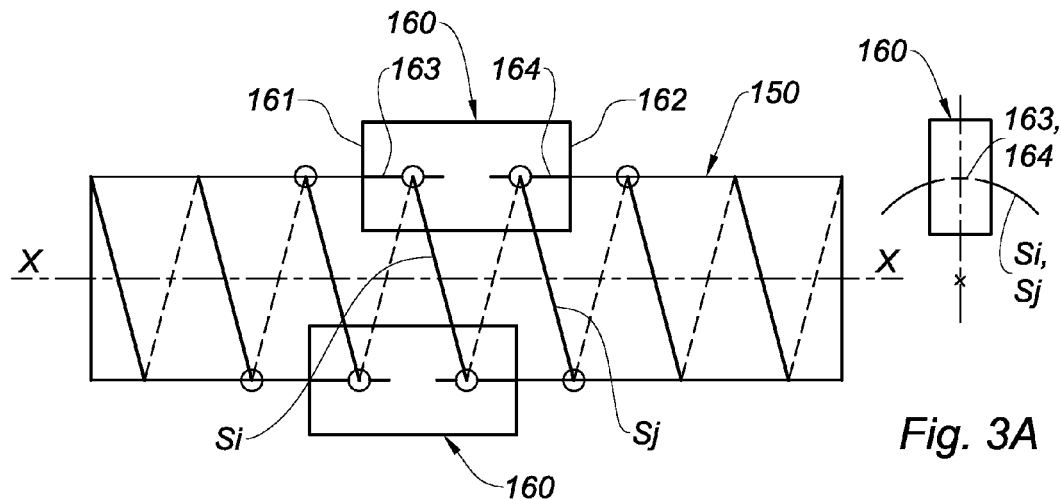
Fig. 3A
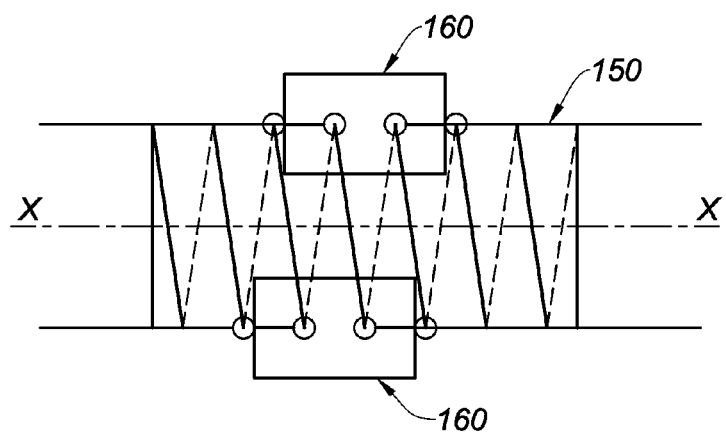
Fig. 3B
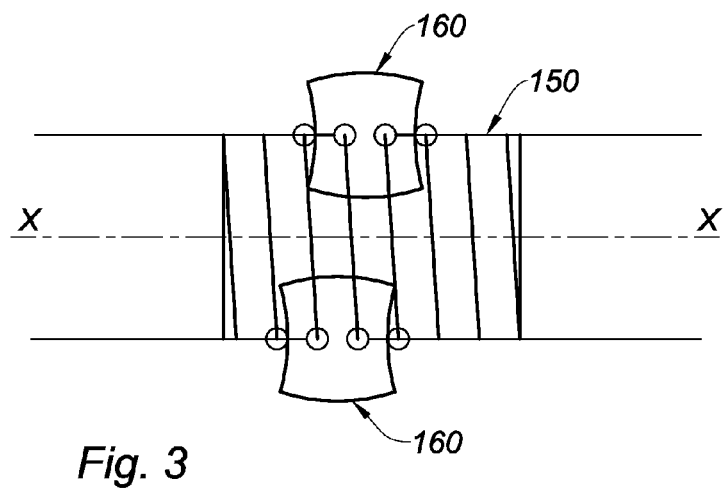
Fig. 3
Fig. 3C

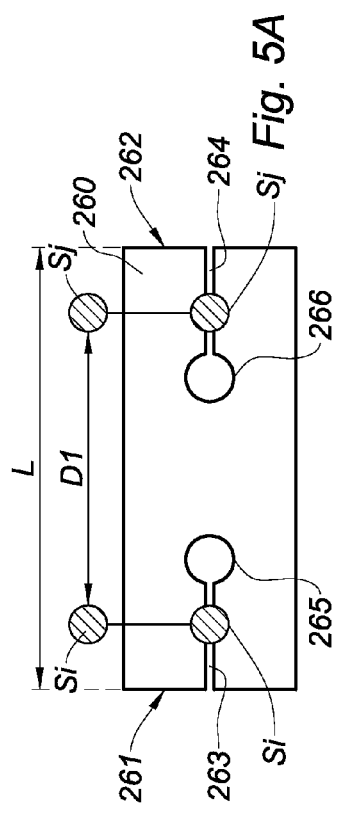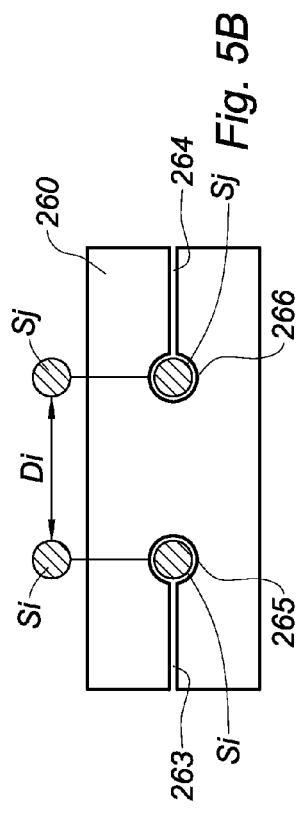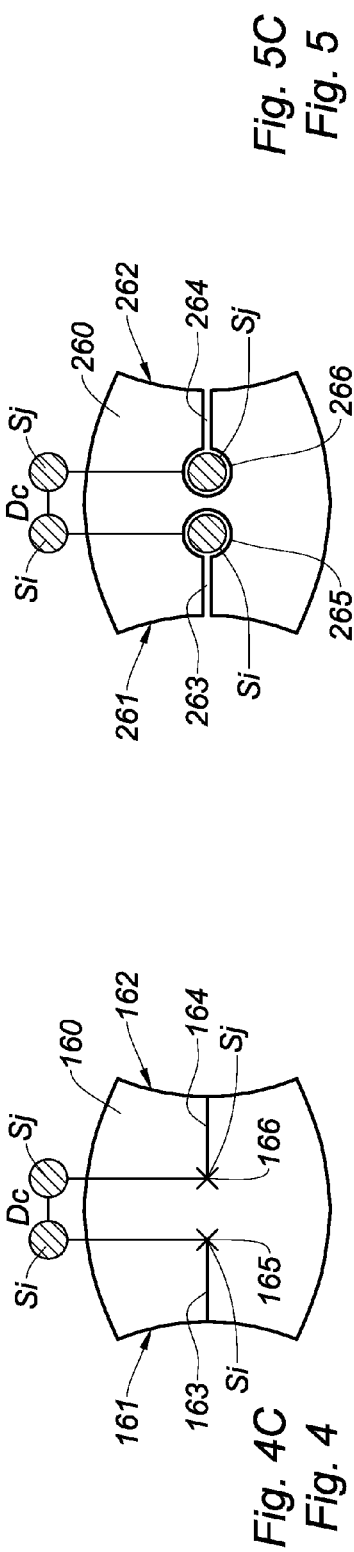
Fig. 5A  Fig. 5B  Fig. 5C
Fig. 5
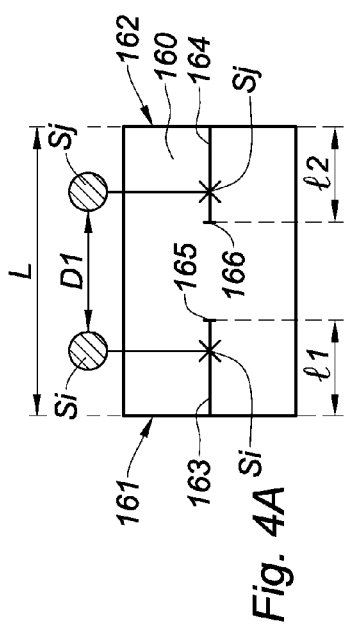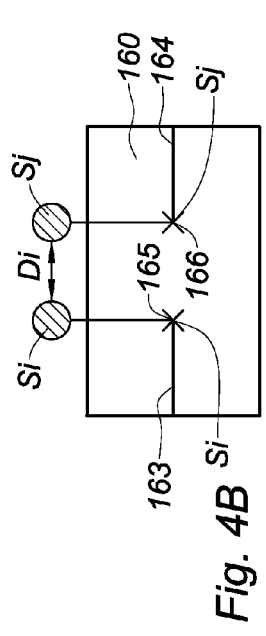
Fig. 4A  Fig. 4B  Fig. 4C
Fig. 4

PNEUMATIC BRAKE BOOSTER

FIELD OF THE INVENTION

The present invention concerns a compressed-air brake booster having a drive piston connected by a membrane to the brake booster cylinder to subdivide it into a forward chamber and a rear chamber and operate by utilizing a drop in pressure to push the piston of the master cylinder by a push rod, the pressure drop in the cylinder, driving the drive piston, being controlled by a plunger valve actuated by the movement of the control rod connected to the brake pedal, the drive piston being thrust into rest position by a return spring supported by the wall of the cylinder, this return spring being equipped with a vibration damper.

BACKGROUND INFORMATION

A pneumatic brake booster equipped with a damping device is discussed in patent document FR 0015542 describes a pneumatic brake booster of the type described above, with a cylindrical helical or conical spring equipped with a damper to reduce or eliminate the vibrations of the return spring pushing the drive piston into its rest position.

Several embodiments of this damper are described in the document. A first embodiment of the damper is a sleeve affixed to the wall of the forward chamber, supported by the forward extremity of the return spring. It forms a sleeve with a curved bead against which the coil of an extremity of the spring rests, holding this bead against the interior wall of the brake booster housing. This rubber damper acts through friction and by elastic extension.

The document describes another embodiment of a damper consisting of a clamp surrounding two or more coils. These are simple, possibly non-extensible, even rigid clamps that, according to the indications provided by the document, impose a shift of the resonance frequency to a value where the vibration could no longer be sustained.

These solutions do, of course, dampen the return spring vibrations, but their implementation is relatively complicated because of the need to place them on the spring more or less installed in the housing of the brake booster or between a portion of the housing and the spring, and their effectiveness is reduced because they operate by friction.

SUMMARY OF THE INVENTION

The object of the present invention is to develop a pneumatic brake booster in which the vibrations of the return spring of the drive piston are eliminated or, at least, reduced significantly so they are inaudible, using an arrangement that is easily installed in the brake booster and reliable throughout the lifespan of the brake booster.

SUMMARY OF THE INVENTION

To that end, an object of the present invention is a brake booster of the type described above, characterized in that the vibration damper consists of a part made of an elastic material working compressively, of overall parallelepipedic shape, with a length greater than the spacing of two coils of the spring prior to installation in the brake booster and whose front and back faces are equipped with a longitudinal slit penetrating the material mass of the damper, which is thus engaged by those two slits on two neighboring coils of the return spring.

The brake booster according to the invention has the advantage of being particularly easy to implement because the vibration damper that equips it is installed on the spring before the spring is mounted in the brake booster, so that the manufacturing line for the brake booster requires almost no alteration because of the addition of the complementary part consisting of this damper.

The damper or dampers equipping two neighboring coils can be associated with the same coils or with different coils, depending on the length of the spring, the damping effect desired, and the symmetry of distribution of damping on the spring.

The damper has the advantage of being a very simple and light part because it consists of elastic material, primarily an elastic foam that does not load down the brake booster return spring.

According to an advantageous characteristic, the brake booster has several dampers distributed regularly around the return spring and, especially, two dampers in symmetrical position.

According to another characteristic, the longitudinal slits receiving the coil segments of the damper spring are each terminated by a cavity forming a retention pocket for securing the coil of the spring. This retention pocket also has the advantage of avoiding the formation of an incipient fracture at the end of the longitudinal slits.

According to an advantageous characteristic, the slits are planar so that the deformation produced by the coil segment housed in each slit locally deforms the slit and assists the damper's grip on each of the coils, thereby preventing its migration along the two coils with which it is associated.

According to another characteristic, one of the slits is equipped with an enlarged entrance so that when the damper is placed on the spring prior to its installation in the brake booster, one of the coils is secured to its pocket at the extremity of the slit and the other coil is in standby position in the enlarged portion of the entrance to the other slit.

Then, when the return spring is compressed so it can be installed in the brake booster, the standby coil in the enlarged entrance, as a result of this compression, enters the pocket at the extremity of the slit.

The damper according to the invention is of an elastic material, which may be an elastic foam, notably a foam made of an elastic plastic material or a synthetic rubber or natural rubber foam.

The present invention will be described in greater detail by an embodiment of a pneumatic brake booster with a return spring damper, shown in the accompanying drawings.

BRIEF DESCRIPTION OF THE DRAWINGS

FIG. 2 is an isometric view of an example of a damper.

FIG. 3A shows the relaxed return spring, prior to its installation in the brake booster.

FIG. 3B shows the state of the return spring after installation in the brake booster at rest.

FIG. 3C shows the state of the return spring and damper in compressed braking position.

FIG. 4A shows the damper mounted on the return spring before installation of the return spring in the brake booster.

FIG. 4B shows the damper on the return spring installed in the brake booster.

FIG. 4C shows the compression of the damper during the braking phase.

FIGS. 5A, 5B and 5C show an embodiment of a damper shown in three states corresponding to the states shown generally in FIGS. 4A, 4B and 4C.

FIG. 6A shows the damper mounted on the relaxed return spring, prior to its installation in the brake booster;

FIG. 6B shows the return spring with the damper in installed position in the brake booster.

DETAILED DESCRIPTION

Figure 1:
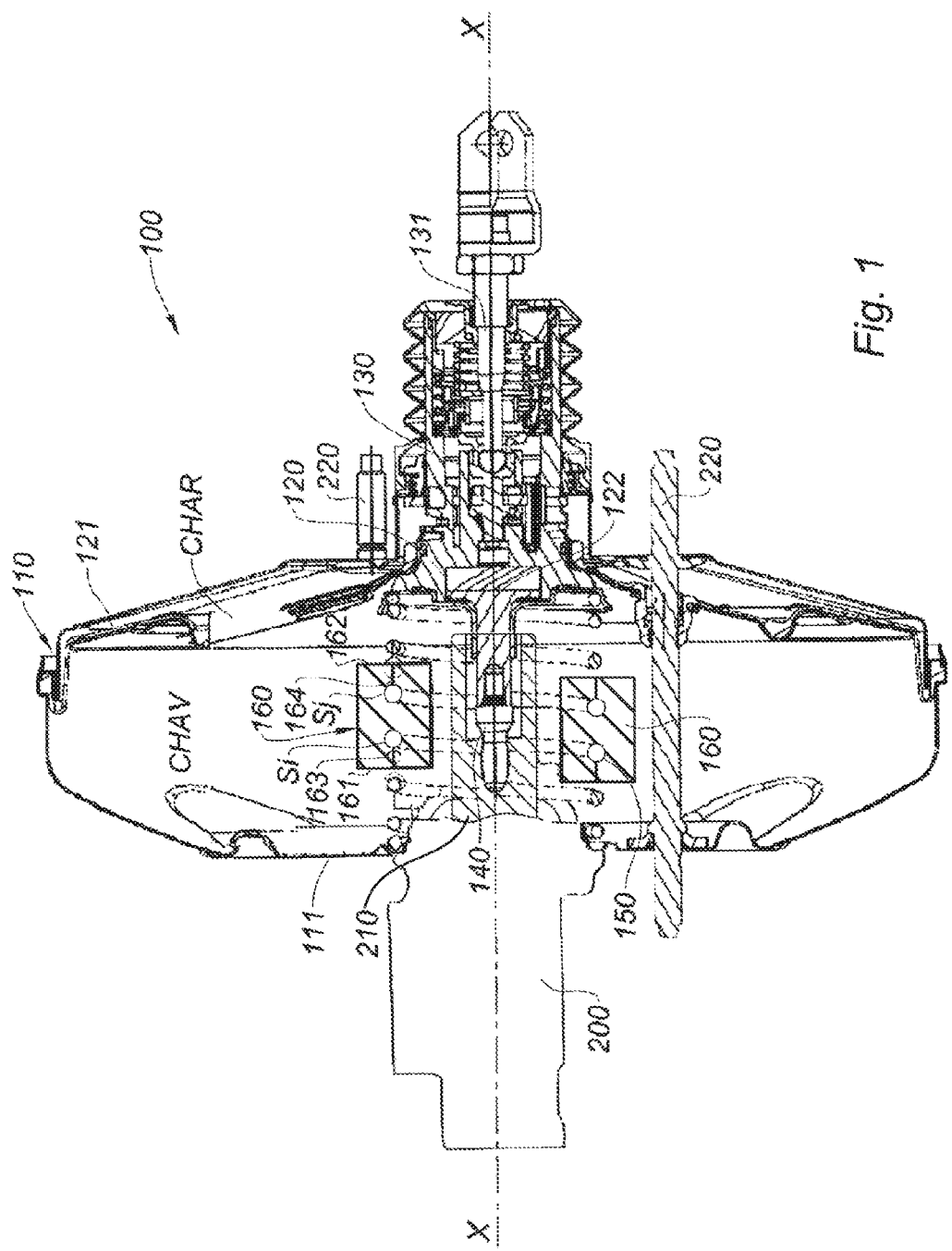
FIG. 1 is an axial cutaway of a pneumatic brake booster according to the invention.

FIG. 1 shows generally and schematically, the structure of a pneumatic brake booster 100 according to the invention, represented in combination with master cylinder 200.

Brake booster 100 consists of housing 110 (here called a cylinder), accommodating drive piston 120 connected by membrane 121 to the housing to subdivide the latter into a forward chamber, CHAV, and a rear chamber, CHAR. Plunger piston 120 bears plunger valve 130 connected to control rod 131, itself connected to the brake pedal. Drive piston 120 acts on push rod 140 borne by piston 210 of master cylinder 200 by reaction disk 122. Drive piston 120 is pushed into rest position (the position represented in FIG. 1) by return spring 150, resting against piston 120 and against forward wall 111 of housing 110 around the opening traversed by the master cylinder and its piston 210.

The structure of brake booster 100 described above is known in itself and does not require more detailed description.

Master cylinder 200 is attached to the firewall of the vehicle passenger compartment near the brake pedal, in general by two anchors 220.

During action on the brake pedal, which is transmitted by control rod 131 to plunger valve 130, the latter controls the pressure drop in the forward chamber, CHAV, which draws drive piston assembly 120 and membrane 121 forward (toward the left in FIG. 1) to push, by reaction disk 122, push rod 140 of piston 210 of the master cylinder and control the flow of pressurized hydraulic fluid through the brake circuit or circuits connected to the master cylinder.

The movement of drive piston 120 occurs against the force developed by return spring 150, which, at the conclusion of the braking phase, pushes drive piston 120 into the position shown in FIG. 1.

Return spring 150 is equipped with vibration damper 160, shown very schematically as being installed on two coils Si, Sj, of spring 150. This damper 160 can consist of one or more dampers, for example, two dampers in symmetrical position with respect to axis xx of spring 150.

In the example of FIG. 1, spring 150 is a cylindrical helical spring, but it could also be a frustoconical helical spring. That example is not shown.

According to the schematic representation of FIG. 2, damper 160 is an elongated part, parallelepipedic or, more generally, cylindrical in the geometric sense of the term, of round or polygonal section, which may be rectangular. This part has length L and two faces, 161, 162, a front face, 161, and a rear face, 162, according to the customary orientation of a brake booster.

Two slits, 163, 164, with the same orientation divide each extremity by penetrating the mass of the body of damper 160 in such a way that the damper can be installed to straddle two neighboring coils, Si, Sj, of the spring; slits 163, 164 are terminated by a small terminal cavity with a round cross-section, 165, 166, forming a pocket to accommodate a coil segment of the spring and take hold there, while also constituting a rounded surface, thereby avoiding the creation of an incipient fracture.

Slits 163, 164 have a depth 11, 112 from respective faces 161, 162.

Slits 163, 164 are here planar but they can also be curved. Each extremity straddles an associated coil sector, straddling it in such a way that the damper works compressively whenever the return spring locally deforms the slit (or groove) created by the curve of the coil, which increases the contact between the segment of the coil and the absorbing elastic material and not only prevents the damper from migrating by twisting along the two coils but this significant contact also absorbs the vibrations of the coil and, more generally, those of the spring.

As shown in FIGS. 3A-3C, in combination with the diagrams of FIGS. 4A-4C, damper 160 may be installed on two coils, Si, Sj, not at an extremity of spring 150 but more or less in the middle of its length, which is thereby divided into two portions for its resonant properties, without this interfering with the spring's operation as a return spring. To avoid unbalancing, even slightly, spring 150, damper 160, which is only associated with a reduced arc of coils Si, Sj, may also be symmetrically complemented, with respect to axis xx of the cylindrical or conical spring, by another damper 160.

As can be seen in FIGS. 3A and 4A, damper 160 consists of a part made of elastic material operating compressively, such as a block of elastic foam, of parallelepipedic shape, of length (L) greater than the distance Dr separating two coils Si, Sj of the return spring when not installed in position in the master cylinder along longitudinal slits 163, 164, along axial direction xx of return spring 150.

Damper 160 is installed between two coils Si, Sj by simply fitting each of the two coils into longitudinal slit 163, 164. Longitudinal slits 163, 164 have length 11, 12, such that the difference in the total length L, less the sum of lengths 11, 12, is less than the distance Dr of two coils Si, Sj at rest. Thus, when damper 160 is mounted on the two coils of return spring 150 prior to installation in brake booster 100, the two coils Si, Sj are not at the cavities 165, 166 of the two longitudinal slits 163, 164, as shown in greater detail in FIG. 4A. To the right of FIG. 3A, we have shown damper 160 installed on coil segment Si, Sj and deforming slit 163, 164, which receives this coil segment.

In addition to coils Si, Sj housed in slots 163, 164 of damper 160, the coils are also shown above damper 260 in each of the positions to facilitate identification of the spacing in the three positions of FIGS. 4A, 4B, and 4C.

The same remark applies to FIGS. 5A, 5B, and 5C, which are also complemented by coils Si, Sj, shown above damper 260 in each representation.

To install spring 150 equipped with damper(s) 160 in the brake booster, it must be compressed (FIG. 3B) so that the two coils Si, Sj engaged in damper 160, slide to cavities 165, 166 of slits 163, 164 of damper 160 (FIG. 4B), which need not be compressed in this position.

Finally, during braking, which results in the advance of the drive piston and compression of return spring 150 (FIG. 3C), damper 160 is compressed as the two coils Si, Sj approach one another. When the brake is released, return spring 150 relaxes and damper 160 transitions from its deformed position, shown in FIG. 4C, to its rest position, shown in FIG. 4B. This deformation, as with the compression of damper 160, absorbing the vibrations of return spring 150.

FIG. 5 shows a practical embodiment 260 of damper 160, presented in a general manner in FIGS. 2 and 4A-C.

Damper 260 consists of a parallelepiped of elastic material, notably a foam, of length L, as described above, having two longitudinal slits 263, 264 issuing from each of end faces 261, 262 for engagement with two neighboring coils Si, Sj of spring 150. Slits 263, 264 terminate in rounded pocket 265, 266, for example, of circular section, which prevents the extremity of each slit from becoming an incipient fracture, while enabling retention of damper 260 on coils Si, Sj by a positive fit when spring 150 is in installed position (FIG. 5B) in the cylinder of the brake booster.

In this embodiment, damper 260 remains securely attached to the two coils Si, Sj of the spring whenever the latter is compressed and released, as shown in FIGS. 5B and 5C. In FIG. 5B, damper 260 is not compressed and its two end faces 261, 262 are flat, whereas in FIG. 5C, spring 150 compresses damper 260, whose faces 261, 262 are thereby curved into a concave shape and the longitudinal sides are mushroom shaped.

FIG. 6 illustrates a variant embodiment of damper 360, whose longitudinal slits 363, 364 are not symmetrical. Slit 363 is terminated by pocket 365 for attachment by positive fit on coil Si once damper 360 is installed on the spring, prior to its installation in the brake booster. In this position, shown in FIG. 6A, the other coil, Sj, is found in an enlarged entrance 367, which initiates longitudinal slit 364 of the other face 362 of damper 360. This slit 364 is also terminated by a rounded pocket 366, for example, of circular section.

FIG. 6A illustrates the pre-assembled position of damper 160, while FIG. 6B illustrates the position of spring 150 when installed in the brake booster. At this moment, the other coil Sj is engaged and retained in pocket 366 at the extremity of second longitudinal slit 364.

The reference list is as follows:
100 Brake booster
110 Housing
111 Front wall
120 Drive piston
121 Membrane
122 Reaction disk
130 Plunger
131 Control rod
140 Push rod
150 Return spring
160, 260, 360 Dampers
161, 162 Damper faces
261, 262 Damper faces
361, 362 Damper faces
165, 166 Terminal cavities
265, 266 Terminal cavities
365, 366 Terminal cavities
163, 164 Longitudinal slits
263, 264 Longitudinal slits
363, 364 Longitudinal slits
367 Enlarged entrance
200 Master cylinder
210 Piston
220 Anchor

The invention claimed is:

1. A pneumatic brake booster, comprising:
a drive piston connected by a membrane to a brake booster cylinder to subdivide the brake booster cylinder into a forward chamber and a rear chamber and operate by a pressure drop to push a piston of a master cylinder by means of a push rod, the pressure drop in the brake booster cylinder driving the drive piston being controlled by a plunger valve actuated by the movement of a control rod connected to a brake pedal, the drive piston being thrust into rest position by a return spring supported by a wall of the brake booster cylinder; and
a vibration damper, included with the return spring, wherein the vibration damper includes a part made of an elastic material working compressively, of parallelepipedic external shape, with a length greater than a spacing of two neighboring coils of the return spring prior to installation in the brake booster and whose front and back faces are each equipped with a longitudinal slit penetrating the material mass of the vibration damper, for engagement by way of the two longitudinal slits on the two neighboring coils of the return spring, wherein each of the longitudinal slits penetrates into the material mass of the vibration damper to a respective depth, and the length of the vibration damper minus a sum of the respective depths is less than a spacing of the two neighboring coils of the return spring at rest.

2. The pneumatic brake booster of claim 1, wherein there are multiple vibration dampers distributed around the return spring.

3. The pneumatic brake booster of claim 1, wherein the longitudinal slits are each terminated by a cavity forming a retention housing for securing the neighboring coils of the return spring.

4. The pneumatic brake booster of claim 1, wherein one of the longitudinal slits is equipped with an entrance sized to have a width greater than a width of a remaining portion of the one of the longitudinal slits.

5. The pneumatic brake booster of claim 4, wherein the entrance is sized to accommodate one of the neighboring coils of the return spring when the vibration damper is in an undeformed state.

6. The pneumatic brake booster of claim 4, wherein the entrance has an opening at the one of the front or back faces sized greater than a thickness of the neighboring coils of the return spring.

7. The pneumatic brake booster of claim 6, wherein the entrance decreases in size from the opening to where the entrance joins the remaining portion of the one of the longitudinal slits.

8. The pneumatic brake booster of claim 1, wherein the longitudinal slits are planar.

9. The pneumatic brake booster of claim 1, wherein the vibration damper is an elastic foam.

10. The pneumatic brake booster of claim 1, wherein there are two vibration dampers distributed around the return spring, the two vibration dampers being located in symmetrical positions about a longitudinal axis of the return spring.

11. The pneumatic brake booster of claim 1, wherein the vibration damper includes a portion of the elastic material extending between the longitudinal slits.

* * * * *